(12) United States Patent
Lee

(10) Patent No.: US 8,046,594 B2
(45) Date of Patent: Oct. 25, 2011

(54) ELECTRONIC DEVICE AND ELECTRONIC DEVICE SYSTEM

(75) Inventor: Byong-jeon Lee, Seoul (KR)

(73) Assignee: Samsung Electronics Co., Ltd, Suwon-si (KR)

(*) Notice: Subject to any disclaimer, the term of this patent is extended or adjusted under 35 U.S.C. 154(b) by 1556 days.

(21) Appl. No.: 11/437,715

(22) Filed: May 22, 2006

(65) Prior Publication Data

US 2006/0290327 A1     Dec. 28, 2006

(30) Foreign Application Priority Data

Jun. 23, 2005  (KR) ................. 10-2005-0054519

(51) Int. Cl.
*G06F 1/26*  (2006.01)
*G06F 1/32*  (2006.01)

(52) U.S. Cl. .......... 713/300; 713/310; 713/320; 307/52; 307/65

(58) Field of Classification Search .............. 713/300, 713/310, 320; 307/52, 65
See application file for complete search history.

(56) References Cited

U.S. PATENT DOCUMENTS

| | | | |
|---|---|---|---|
| 5,630,142 A | 5/1997 | Crump et al. | |
| 6,240,520 B1 | 5/2001 | Cha | |
| 6,262,605 B1 | 7/2001 | Ku | |
| 6,381,181 B1 | 4/2002 | Nguyen | |
| 6,701,442 B1* | 3/2004 | Nuttall et al. ............. | 713/300 |
| 6,725,384 B1 | 4/2004 | Lambino et al. | |
| 6,770,166 B1 | 8/2004 | Fischer | |
| 6,996,731 B1 | 2/2006 | Obitsu | |
| 7,114,090 B2* | 9/2006 | Kardach et al. ............ | 713/323 |
| 7,171,571 B2* | 1/2007 | Starr et al. ................ | 713/320 |
| 7,180,613 B2* | 2/2007 | Katsuragi ................. | 358/1.14 |
| 7,320,077 B2* | 1/2008 | Kim ......................... | 713/300 |
| 7,469,350 B2* | 12/2008 | Henderson et al. ....... | 713/300 |
| 2002/0039018 A1 | 4/2002 | Sanzo et al. | |
| 2003/0233509 A1* | 12/2003 | Chang ...................... | 710/316 |
| 2004/0109192 A1* | 6/2004 | Nuttall et al. ............. | 358/1.14 |
| 2006/0101294 A1* | 5/2006 | Lee et al. .................. | 713/300 |
| 2006/0230293 A1* | 10/2006 | Veselic ..................... | 713/300 |

FOREIGN PATENT DOCUMENTS

| | | |
|---|---|---|
| JP | 2001-027916 | 1/2001 |
| KR | 1999-50055 | 7/1999 |
| WO | WO 03/003405 | 1/2003 |

OTHER PUBLICATIONS

Korean Office Action issued in Korean Patent Application No. 2005-54519 on Jun. 28, 2006.

* cited by examiner

*Primary Examiner* — Thomas Lee
*Assistant Examiner* — Michael J Brown
(74) *Attorney, Agent, or Firm* — Jefferson IP Law, LLP

(57) ABSTRACT

An electronic device includes electronic components, including: a power switching unit to output a power switching signal; a first power input unit to receive first power from one of a plurality of external power devices; a second power input unit to receive second power from one of the external power devices; a power converting unit to convert the first power received through the first power input unit into driving power having a voltage level to drive each electronic component, and to supply the driving power to each electronic component; and a power management unit to control the power converting unit to be enabled when the second power is input through the second power input unit, and control whether the power converting unit is enabled corresponding to the power switching signal from the power switching unit, when the second power is not input through the second power input unit.

31 Claims, 14 Drawing Sheets

FIG. 13

| COMBINATION PORT PIN NO | SIGNAL | MAIN BODY INPUT/OUTPUT PORT | MAIN BODY INPUT/OUTPUT PORT PIN NO | COMBINATION PORT PIN NO | SIGNAL | MAIN BODY INPUT/OUTPUT PORT | MAIN BODY INPUT/OUTPUT PORT PIN NO |
|---|---|---|---|---|---|---|---|
| P1 | GND_S | | 2 | P19 | USB1+ | MAIN BODY USB PORT (#1) | 3 |
| P2 | TPB− | MAIN BODY 1394 PORT | 3 | P20 | USB1− | | 2 |
| P3 | TPB+ | | 4 | P21 | GND_S | | 4 |
| P4 | TPA− | | 5 | P22 | USB2+ | MAIN BODY USB PORT (#2) | 3 |
| P5 | TPA+ | | 6 | P23 | USB2− | | 2 |
| P6 | GND_S | | 2 | P24 | GND_S | | 4 |
| P7 | CRT_HSYNC | | 1,3 | P25 | HDD_LED | | 1 |
| P8 | CRT_VSYNC | | 14 | P26 | PWR | | 2 |
| P9 | CRT_HSYNC_GND_S | | 5 | P27 | LED | | 3 |
| P10 | VDDCDA | | 12 | P28 | DATA_IR | | 4 |
| P11 | VDDCCL | | 15 | P29 | CLK_IR | MAIN BODY CONTROL PORT (D−Sub / F) | 5 |
| P12 | GND | MAIN BODY VIDEO PORT (D−Sub / M) | 10 | P30 | GPIO | | 6 |
| P13 | CRT_R | | 1 | P31 | IR_TRANS# | | 7 |
| P14 | CRT_R_GND_S | | 6 | P32 | SLP_S3# | | 8 |
| P15 | CRT_G | | 2 | P33 | SLP_S3# | | 9 |
| P16 | CRT_G_GND_S | | 7 | P34 | GND | | 10 |
| P17 | CRT_B | | 3 | P35 | V_SB_GND | POWER OUTPUT | 1 |
| P18 | CRT_B_GND_S | | 8 | P36 | V_SB | | 4 |

ELECTRONIC DEVICE AND ELECTRONIC DEVICE SYSTEM

CROSS-REFERENCE TO RELATED APPLICATIONS

This application claims the benefit of Korean Patent Application No. 2005-54519, filed Jun. 23, 2005, in the Korean Intellectual Property Office, the disclosure of which is incorporated herein by reference.

BACKGROUND OF THE INVENTION

1. Field of the Invention

Aspects of the invention relate to an electronic device and an electronic device system, and more particularly, to an electronic device and an electronic device system, which receives power from a first device and is capable of controlling the power of the first device and for itself.

2. Description of the Related Art

Recently, many independent electronic devices, such as a computer system or an audio/video (AV) system, have been used being connected to each other. For example, in the computer system, a computer and a monitor are connected to each other. In the AV system, a digital versatile disc (DVD) player, a television and an amplifier are connected to one another. Also, the computer system has been recently connected to the devices of the AV system, thereby forming a multimedia system.

However, such a conventional electronic device system should individually supply power to the respective electronic devices such as the computer, the monitor, the DVD player, the television and the amplifier. Further, power buttons are individually provided in the respective electronic devices, so that it can be inconvenient for a user to manipulate the respective power buttons of the electronic devices one by one when the user wants to turn on/off the electronic devices.

Accordingly, when one electronic device (hereinafter, referred to as a "second electronic device") of the electronic device system receives the power needed for its operation from another electronic device (hereinafter, referred to as a "first electronic device"), the power management of the second electronic device can be conveniently implemented by controlling the power supplied from the first electronic device to the second electronic device.

Further, turning on/off the first electronic device as well as the second electronic device through either of the first or second electronic device, e.g., the second electronic device, would be convenient.

Also, when the second electronic device, of which the power management is implemented by the power supplied from the first electronic device, receives the power, not from the first electronic device, but another power source, various power sources can be selectively used in supplying the power to the second electronic device, thereby enhancing the convenience to the user. Thus, it is can be advantageous when the power of the second electronic device is controlled independently of the first electronic device.

SUMMARY OF THE INVENTION

Accordingly, it is an aspect of the invention to provide an electronic device and an electronic device system, in which a second electronic device receives power from a first electronic device and/or other external power device, and the power supplied to the second electronic device is controlled by the first electronic device or by the second electronic device independently of the first electronic device, depending upon the input of a first power and a second power to the second electronic device. The first power can be a main power and the second power can be a standby power for the second electronic device, for example.

The foregoing and/or other aspects of the present invention can be achieved by providing an electronic device having a plurality of electronic components, including: a power switching unit to output a power switching signal; a first power input unit to receive a first power from one of a plurality of external power devices; a second power input unit to receive a second power from one of the plurality of external power devices; a power converting unit to convert the first power received through the first power input unit into a driving power having a voltage level to drive the plurality of electronic components, and to supply the driving power to the plurality of electronic components; and a power management unit to control the power converting unit to enable the power converting unit when the second power is input through the second power input unit, and the power management unit to control whether the power converting unit is enabled corresponding to the power switching signal from the power switching unit, when the second power is not input through the second power input unit.

According to a further aspect of the invention, the power converting unit operates according to whether the first power is supplied from the first power input unit when the power converting unit is enabled by the power management unit in a state that the second power is input through the second power input unit.

According to another aspect of the invention, the power converting unit includes a DC/DC converter to convert the voltage level of the first power into a plurality of driving powers having various voltage levels to drive the respective electronic components.

According to an additional aspect of the invention, the power management unit includes a JK flip-flop having a preset input terminal in which a logic value is determined according to whether the second power is input; a J input terminal and a K input terminal in which logic values are determined according to whether the first power is input; a clock input terminal to which the power switching signal is input from the power switching unit; and a Q output terminal to control whether the power converting unit is enabled according to the logic values of the preset, J, K and clock input terminals.

According to a further aspect of the present invention, the preset input terminal of the JK flip-flop is set to output an enable signal having the logic value for enabling the power converting unit through the Q output terminal when the second power is supplied, and to vary the logic value of the enable signal output through the Q output terminal in correspondence to variance of the logic value of the power switching signal input through the clock input terminal when the second power is not supplied.

According to aspects of the invention, the external power device can include a commercial power adapter, and the first power input unit has a DC connection structure for the commercial power adapter. Also, a state that the second power is input through the second power input unit includes a state that the first power and the second power are input from one of the external power devices.

The foregoing and/or other aspects of the invention can be achieved by providing an electronic device system including: a first electronic device, comprising: a first power output unit to output a first power to the outside of the first electronic device; and a second power output unit to output a second power to the outside of the first electronic device; and a second electronic device, including: a plurality of electronic components interlocking with the first electronic device; a power switching unit to output a power switching signal; a first power input unit to receive one of the first power from the first electronic device and an external power from a predetermined external power device; a second power input unit to receive the second power from the first electronic device; a power converting unit to convert the first power received through the first power input unit into a driving power having a voltage level to drive the plurality of electronic components, and to supply the driving power to the plurality of electronic components; and a power management unit to control the power converting unit to enable the power converting unit when the second power is input through the second power input unit, and the power management unit to control whether the power converting unit is enabled corresponding to the power switching signal from the power switching unit, when the second power is not input through the second power input unit.

According to an aspect of the invention, the power converting unit operates according to whether power is supplied through the first power input unit when the power converting unit is enabled in the state that the second power is input through the second power input unit.

According to another aspect of the invention, the electronic device system further includes: a first power cable to connect the first power output unit of the first electronic device with the first power input unit of the second electronic device; and a second power cable to connect the second power output unit of the first electronic device with the second power input unit of the second electronic device.

According to further aspects of the invention, the first electronic device further includes a plurality of first input/output ports including a video port to output a video signal; the second electronic device further includes a combination port electrically connected to the plurality of first input/output ports, and a plurality of second input/output ports each to respectively connect to an external device; and an electronic component of the second electronic device includes a display unit to display an image based on the video signal received through the combination port, and a control module to control an interface between the combination port and the second input/output ports.

According to aspects of the invention, the electronic device system further includes a device connection cable including a plurality of first connectors each to respectively connect to the plurality of first input/output ports, a second connector to connect to the combination port, and a combination cable to electrically connect the plurality of first connectors with the second connector, wherein the second power cable is provided integrally with the device connection cable and allocated to at least one signal line among signal lines of the device connection cable.

According to further aspects of the invention, the power switching signal output from the power switching unit is transmitted to the first electronic device through the combination port, the device connection cable and at least a corresponding one of the first input/output ports, and the first electronic device includes a power supply to output the first power and the second power, and a system controller to control whether the power supply outputs the first power or the second power in correspondence to the input power switching signal.

Additional aspects and/or advantages of the invention are set forth in or are evident from the description which follows, or can be learned by the practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 13 is a table showing a pin structure of a combination port of the monitor of the electronic device system of FIG. 5.

DETAILED DESCRIPTION OF THE EMBODIMENTS

Figure 1:
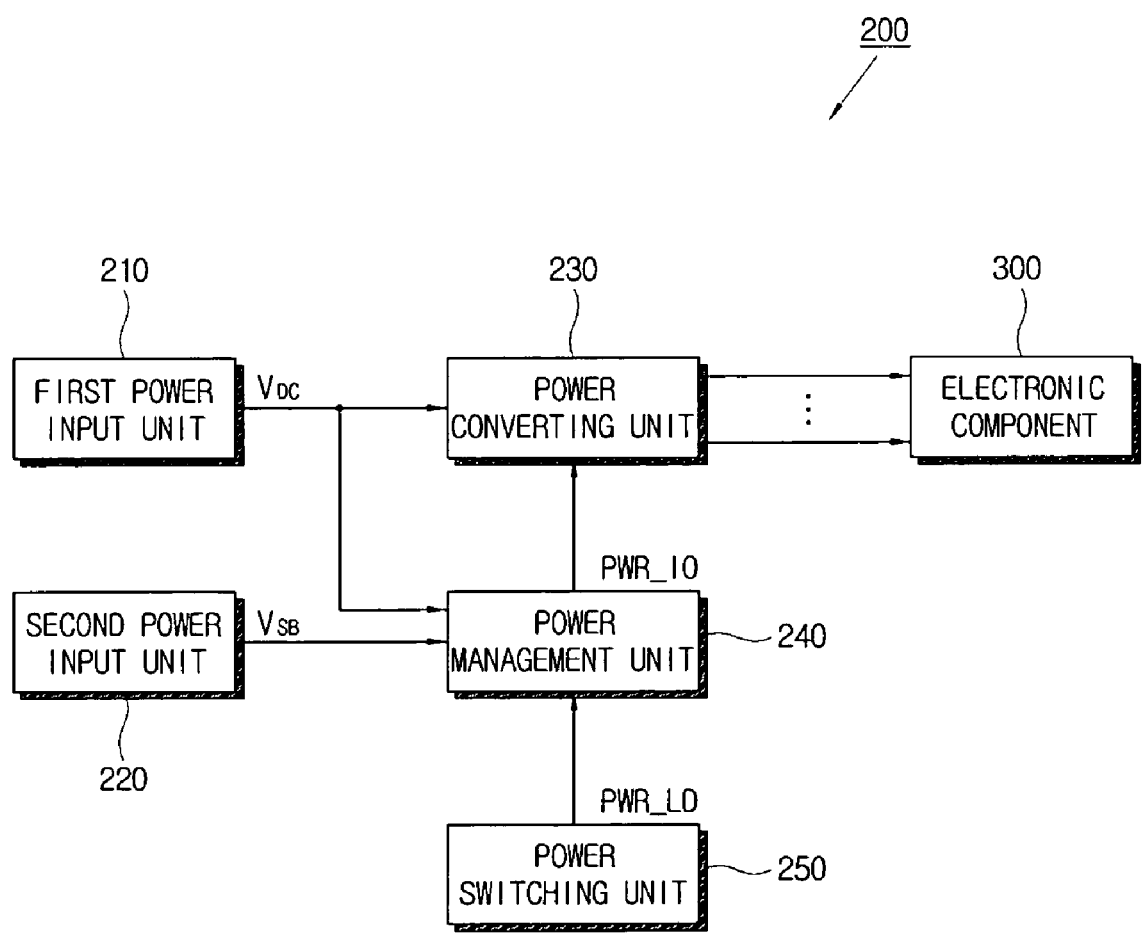
FIG. 1 is a control block diagram of an electronic device according to an embodiment of the invention.

Reference will now be made in detail to embodiments of the invention, examples of which are illustrated in the accompanying drawings, wherein like reference numerals refer to the like elements throughout. The embodiments are described below in order to explain the invention by referring to the figures.

As shown in FIG. 1, an electronic device 200 includes a power switching unit 250, a first power input unit 210, a second power input unit 220, a power converting unit 230 and a power management unit 240. The power switching unit 250 outputs a power switching signal PWR_LD according to a user's selection. In this regard, the power switching unit 250 can be achieved by a button or the like, which is provided in an external region of the electronic device 200 and to output the power switching signal PWR_LD according to the user's selection. Alternatively, the power switching unit 250 can be achieved by a remote control device including a remote controller and a wireless signal receiver 331 (FIG. 11) receiving a wireless signal from the remote controller and outputting the power switching signal PWR_LD corresponding to the wireless signal.

The first power input unit 210 receives first power $V_{DC}$ from outside the electronic device 200. Further, the second power input unit 220 receives second power $V_{SB}$ from the outside of the electronic device 200. The first power $V_{DC}$ and the second power $V_{SB}$ are of direct current (DC) power and are different in a voltage level. For example, the first power $V_{DC}$ can be used as main power $V_{DC}$ to drive a plurality of electronic components 300 of the electronic device 200, and the second power $V_{SB}$ can be used as standby power $V_{SB}$ to drive a specific electronic component 300 of the electronic device 200, e.g., a microcomputer 330 (refer to FIG. 11), of which power is maintained even though the electronic device 200 is turned off. In the description herein, the first power $V_{DC}$ and the second power $V_{SB}$ are used as the main power $V_{DC}$ and the standby power $V_{SB}$, respectively.

The first power input unit 210 has a DC connection structure of a commercial power adapter. Thus, the first power input unit 210 can receive the main power $V_{DC}$ from another external power device, e.g., another electronic device 200 (to be described later), or receive the main power $V_{DC}$ from the commercial power adapter. Also, another electronic device 100 (FIG. 5) supplying the main power $V_{DC}$ and the standby power $V_{SB}$ to the electronic device 200 according to an embodiment of the invention will be defined as a first electronic device 100, and the electronic device 200 receiving the main power $V_{DC}$ and the standby power $V_{SB}$ will be defined as a second electronic device 200, the electronic device 100 being an example of a device, among other suitable devices, to supply the main power $V_{DC}$ and the standby power $V_{SB}$ to the electronic device 200.

The power converting unit 230 converts the main power $V_{DC}$ input through the first power input unit 210 into a driving power having a voltage level to drive the specific electronic component 300, and supplies the driving power to each electronic component 300. The power converting unit 230 according to an embodiment of the invention can include, for example, a DC/DC converter to convert the main power $V_{DC}$ into a plurality of driving powers having different voltage levels to drive the respective electronic components 300. For example, the DC/DC converter converts the main power $V_{DC}$ into the driving powers having a voltage level of 5V or 3.3V, and supplies the driving powers respectively to each of the electronic components 300.

The power management unit 240 controls whether the power converting unit 230 is enabled or not on the basis of whether the standby power $V_{SB}$ is input through the second power input unit 220 and on the basis of the power switching signal PWR_LD from the power switching unit 250. The power management unit 240 controls the power converting unit 230 to be enabled when the standby power $V_{SB}$ is input through the second power input unit 220. Thus, the power converting unit 230 is enabled while the standby power $V_{SB}$ is input through the second power input unit 220.

In the state that the standby power $V_{SB}$ is input through the second power input unit 220, the enablement of the power converting unit 230 is determined according to whether the main power $V_{DC}$ is input through the first power input 210. That is, supplying the power from the second electronic device 200 to the electronic component 300 is determined according to whether the main power $V_{DC}$ is supplied from the outside of the electronic device 200. Thus, in the case that the first power input unit 210 receives the power from the first electronic device 100, the first electronic device 100 controls whether the main power $V_{DC}$ is supplied or not, thereby managing the power supplied to the second electronic device 200.

On the other hand, in the state that the standby power $V_{SB}$ is not input through the second power input unit 220, the power management unit 240 controls whether the power converting unit 230 is enabled or not on the basis of the power switching signal PWR_LD from the power switching unit 250. Thus, when the standby power $V_{SB}$ is not input through the second power input unit 220, the power management of the second electronic device 200 is implemented by selectively manipulating the power switching unit 250.

In the case where the first power input unit 210 and the second power input unit 220 of the second electronic device 200, according to an embodiment of the invention, receive the main power $V_{DC}$ and the standby power $V_{SB}$ from the first electronic device 100, respectively, and the first electronic device 100 is capable of determining whether the main power $V_{DC}$ and the standby power $V_{SB}$ are supplied to the second electronic device 200, the power management of the second electronic device 200 is controlled by the first electronic device 100. Further, in the case where the second electronic device 200, according to an embodiment of the invention, receives the main power $V_{DC}$ from another power source, an adapter or the like, but cannot receive the standby power $V_{SB}$ from the corresponding power source, the electronic components 300 are driven by the main power $V_{DC}$, and the power of the second electronic device 200 is managed by the power switching signal PWR_LD from the power switching unit 250.

The power management unit 240 is described with reference to FIG. 2. The power management unit 240 can include a JK flip-flop 241 to output an enable signal PWR_IO so as to selectively control whether the power converting unit 230 is enabled or not according to whether the standby power $V_{SB}$ is input or not, according to whether the main power $V_{DC}$ is input or not, or on the basis of the power switching signal PWR_LD.

Figure 2:
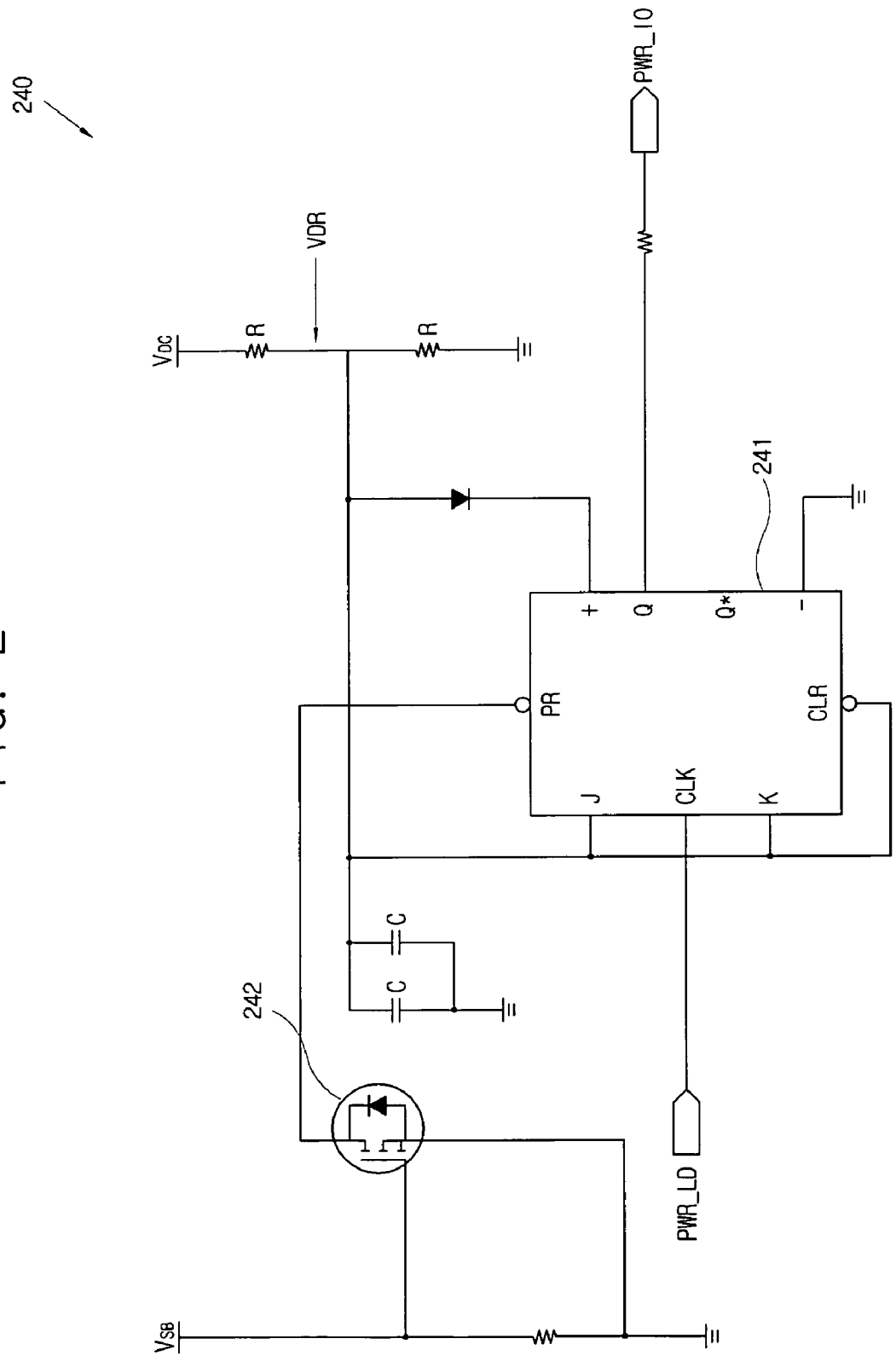
FIG. 2 is a circuit diagram of a power management unit of the electronic device of FIG. 1.
Figure 3A:
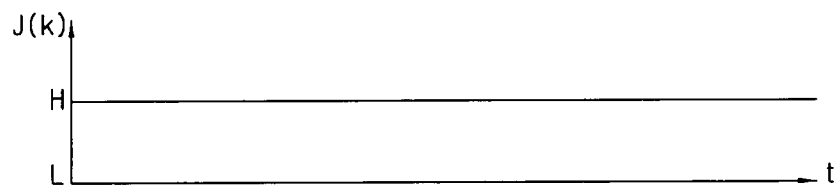
FIGS. 3A to 3E illustrate a relation among pin states of the power management unit of FIG. 2.
Figure 3B:
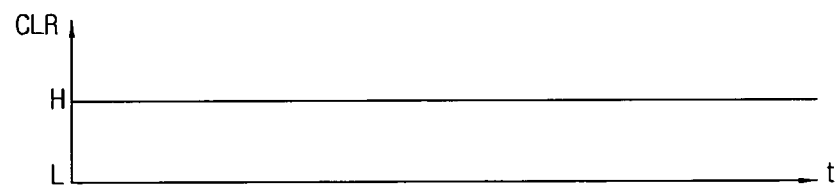
Figure 3C:
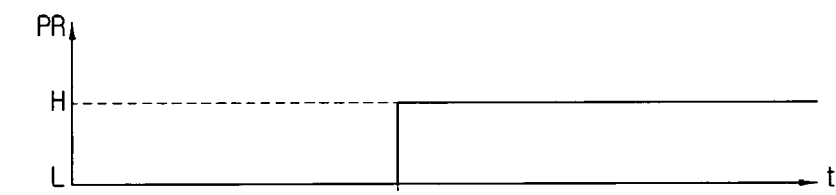
Figure 3D:
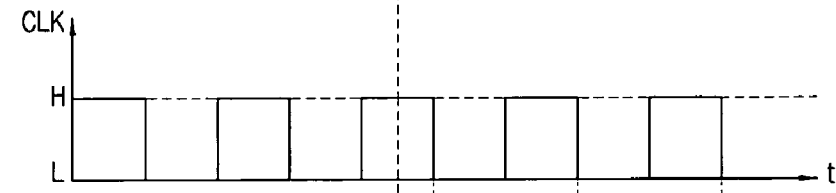
Figure 3E:
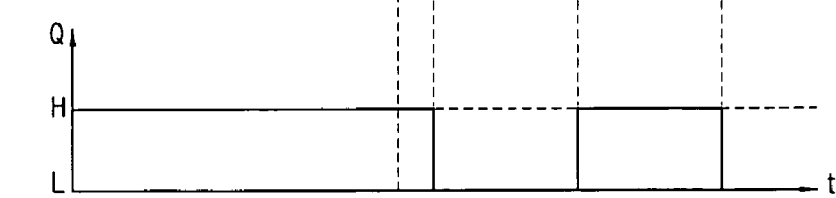

The JK flip-flop 241, as shown in FIG. 2, includes a preset input terminal PR in which a logic value is determined according to whether the standby power $V_{SB}$ is input or not; a J input terminal and a K input terminal in which logic values are determined according to whether the main power $V_{DC}$ is input or not; and a clock input terminal CLK to which the power switching signal PWR_LD is input from the power switching unit 250. Further, the JK flip-flop 241 can include a Q output terminal to output an enable signal PWR_IO whose logic value is variable according to the logic values of the J, K and clock input terminals.

The operations of the JK flip-flop 241, according to an embodiment of the invention, will be described with reference to FIGS. 2 and 3. First, in the state that the main power $V_{DC}$ is input through the first power input unit 210, the J and K input terminals are maintained in a high level. As illustrated in FIG. 2, the power management unit 240 can include a voltage dividing register VDR and capacitors C to maintain the J and K input terminals in the high level according to the main power $V_{DC}$ input through the first power input unit 210.

Then, when the standby power $V_{SB}$ input through the second power input unit 220 and is applied to a switching device 242, e.g., a gate terminal of a metal oxide semiconductor field effect transistor (MOSFET), the switching device 242 is turned on. As the switching device 242 is turned on, the preset input terminal of the JK flip-flop 241 becomes a low state, so that the enable signal PWR_IO output from the Q output terminal is maintained in the high level regardless of state change of the J, K, clock (CLK) and clear (CLR) input terminals (high state). Therefore, the power converting unit 230 is maintained in an enabled state while the standby power $V_{SB}$ is input through the second power input unit 220.

On the other hand, when the standby power $V_{SB}$ is not input through the second power input unit 220, the switching device 242 is turned off, so that the preset input terminal PR of the JK flip-flop 241 is switched into a high state. At this time, the J, K and clear input terminals are maintained in the high state according as the main power $V_{DC}$ is supplied, so that the state of the enable signal PWR_IO output from the Q output terminal according to the characteristic of the JK flip-flop 241 is determined according to the state of the clock input terminal CLK.

In the power management unit 240, a negative-edge trigger flip-flop 241 is used as the JK flip-flop 241, according to an embodiment of the invention. Thus, every time when the state of the clock input terminal CLK, i.e., the logic value of the power switching signal PWR_LD from the power switching unit 250 is switched from the high state to the low state, the enable signal PWR_IO output from the Q output terminal is either switched from the high state to the low state or the low state to the high state.

FIGS. 3A to 3E illustrate a state relation between each input terminal and the Q output terminal of the JK flip-flop 241 with the foregoing configuration. As shown in FIGS. 3A to 3E, the enable signal PWR_IO output from the Q output terminal is maintained in the high level while the preset input terminal PR is maintained in the low level, i.e., while the standby power $V_{SB}$ is input. However, the enable signal PWR_IO output from the Q output terminal is changed corresponding to the state change of the power switching signal PWR_LD input through the clock input terminal CLK while the preset input terminal PR is maintained in the high level, i.e., while the standby power $V_{SB}$ is not input.

Figure 4:
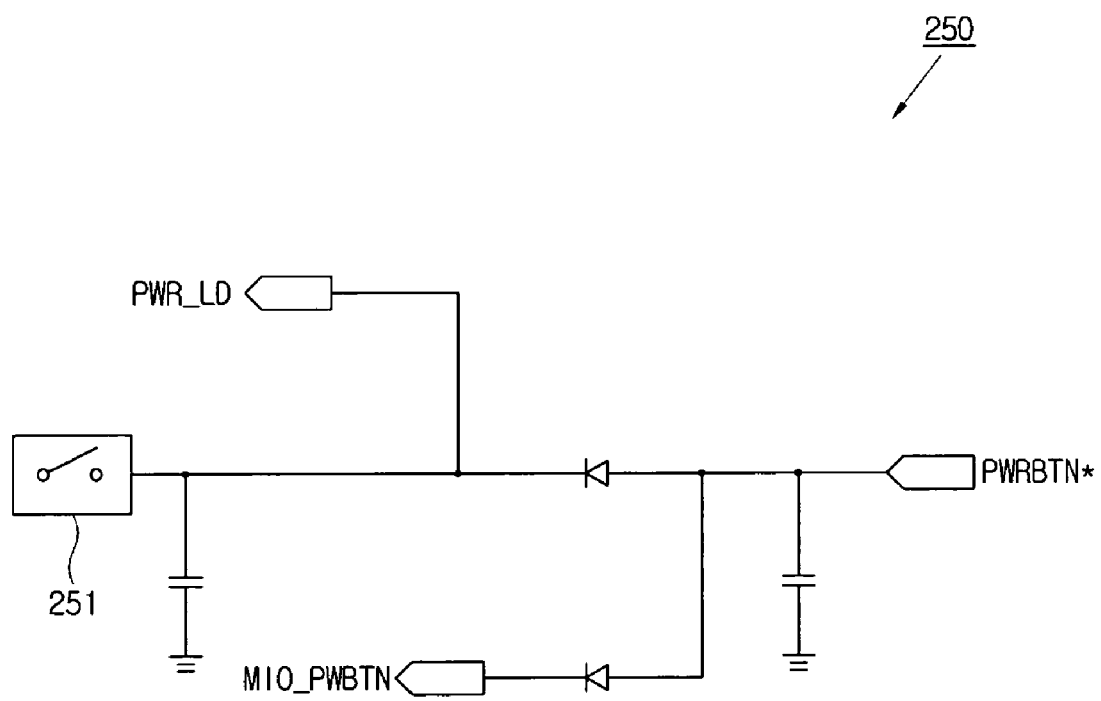
FIG. 4 is a circuit diagram of a power switching unit of the electronic device of FIG. 1.

FIG. 4 is a circuit diagram of a power switching unit 250 of the second electronic device 200 according to an embodiment of the invention. As shown therein, the power switching unit 250 includes a switch 251 that is opened/closed according to a user's selection. In FIG. 4, a terminal PWRBTN* is maintained in the high state, and outputs the power switching signal PWR_LD according to the opened/closed state of the switch 251. Here, the terminal PWRBTN* can be connected to an input-output control hub (ICH) 122 of a computer main body 100 (FIG. 7) and, therefore, the computer main body 100 can sense an operating state of the power switching unit 250.

Further, the power switching unit 250 can include a terminal MIO_PWBTN to set an operating state of a separate power source. Here, the terminal MIO_RWBTN can be connected to a wireless signal receiver 331 (FIG. 11) that is turned on/off according to operation of a remote controlling device. Thus, the ICH 122 of the computer main body 100 can also sense the state change of the terminal MIO_PWBTN. In this regard, the state change of the terminal MIO_PWBTN is sensed by the microcomputer 330 (FIG. 11) and transmitted to the computer main body 100, so that the ICH 122 of the computer main body 100 can determine whether the state of the terminal PWRBTN* is changed due to the operation of the switch 251 or by a state change of the terminal MIO_PWBTN.

Figure 5:
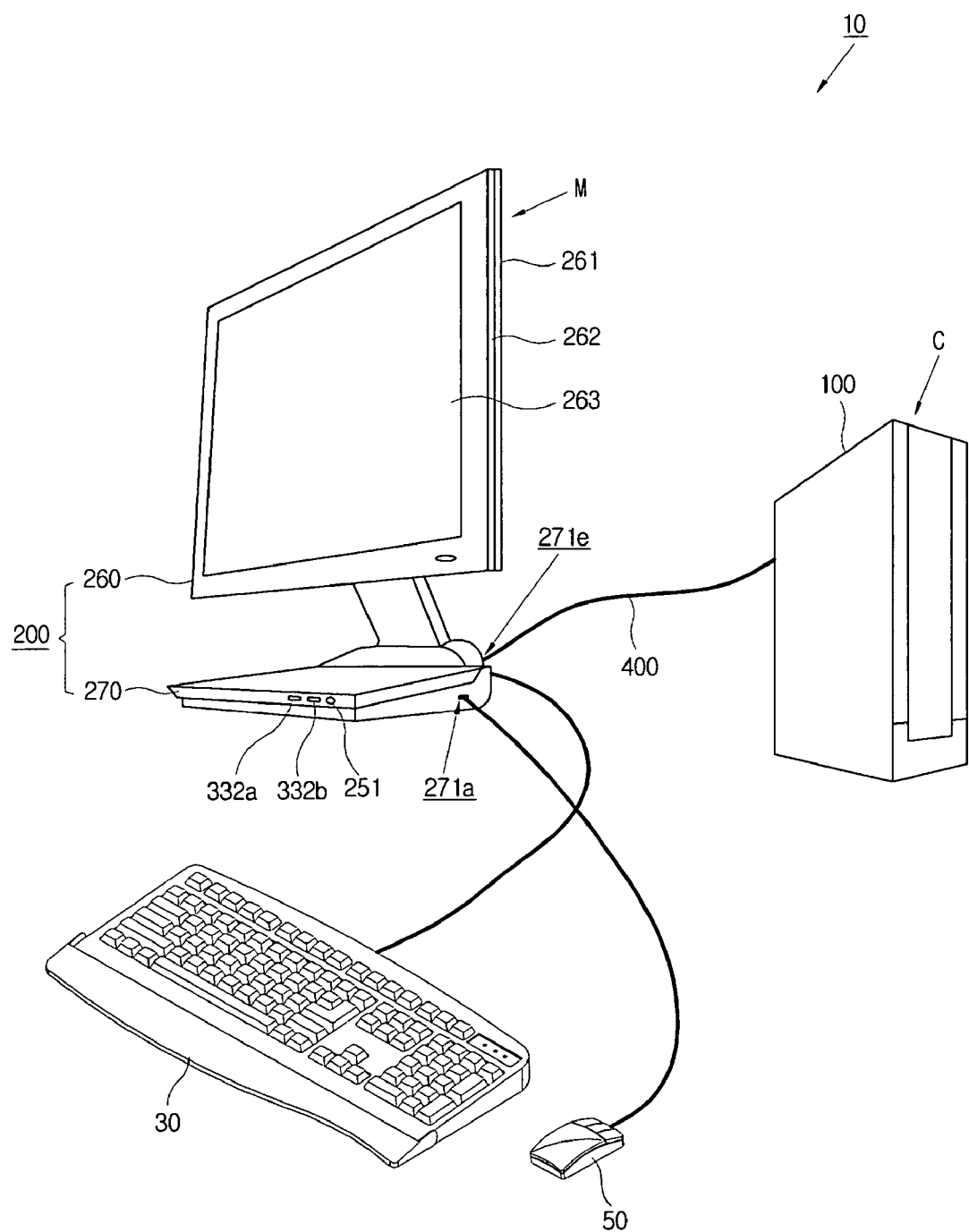
FIG. 5 illustrates an electronic device system according to an embodiment of the invention.

Referring to FIG. 5, an electronic device system 10 according to another embodiment of the invention is illustrated. As shown in FIG. 5, the electronic device system 10, according to an embodiment of the invention, is described with reference to a computer C as the first electronic device 100 and a monitor M as the second electronic device 200. Further, like elements of the foregoing monitor M, as the electronic device 200, refer to like numerals in the following discussion.

Figure 6:
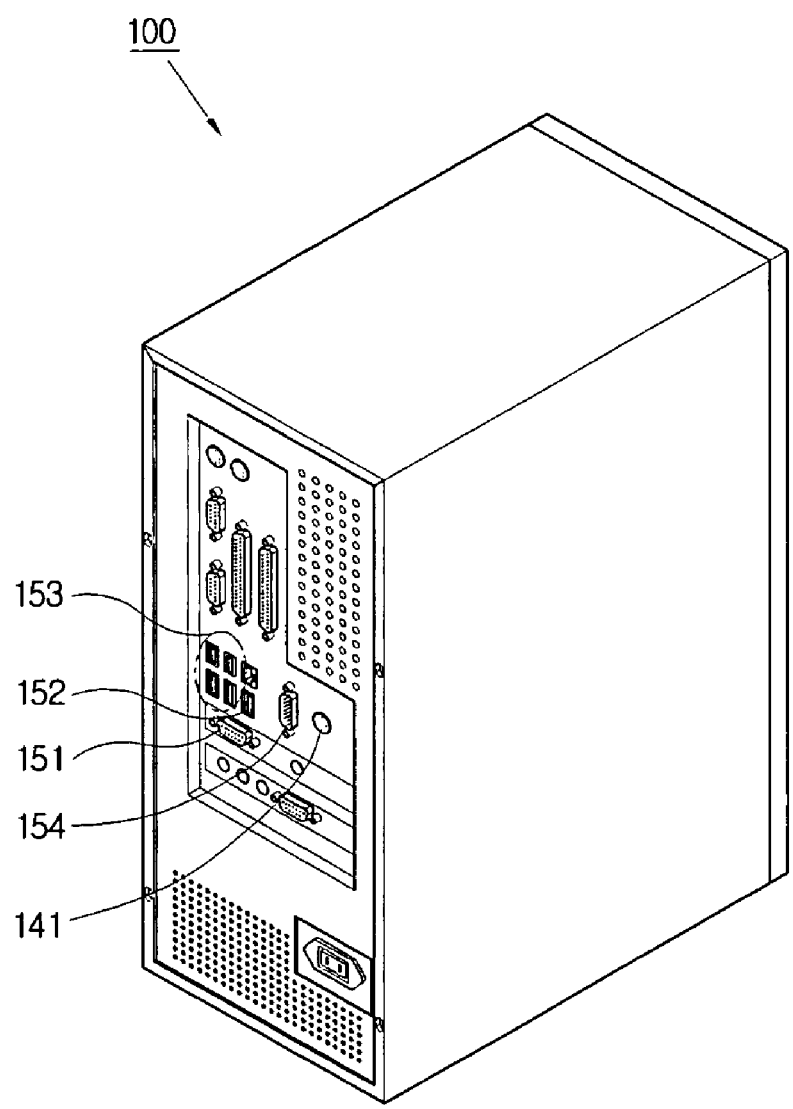
FIG. 6 is a rear perspective view of a computer main body of the electronic device system of FIG. 5.
Figure 7:
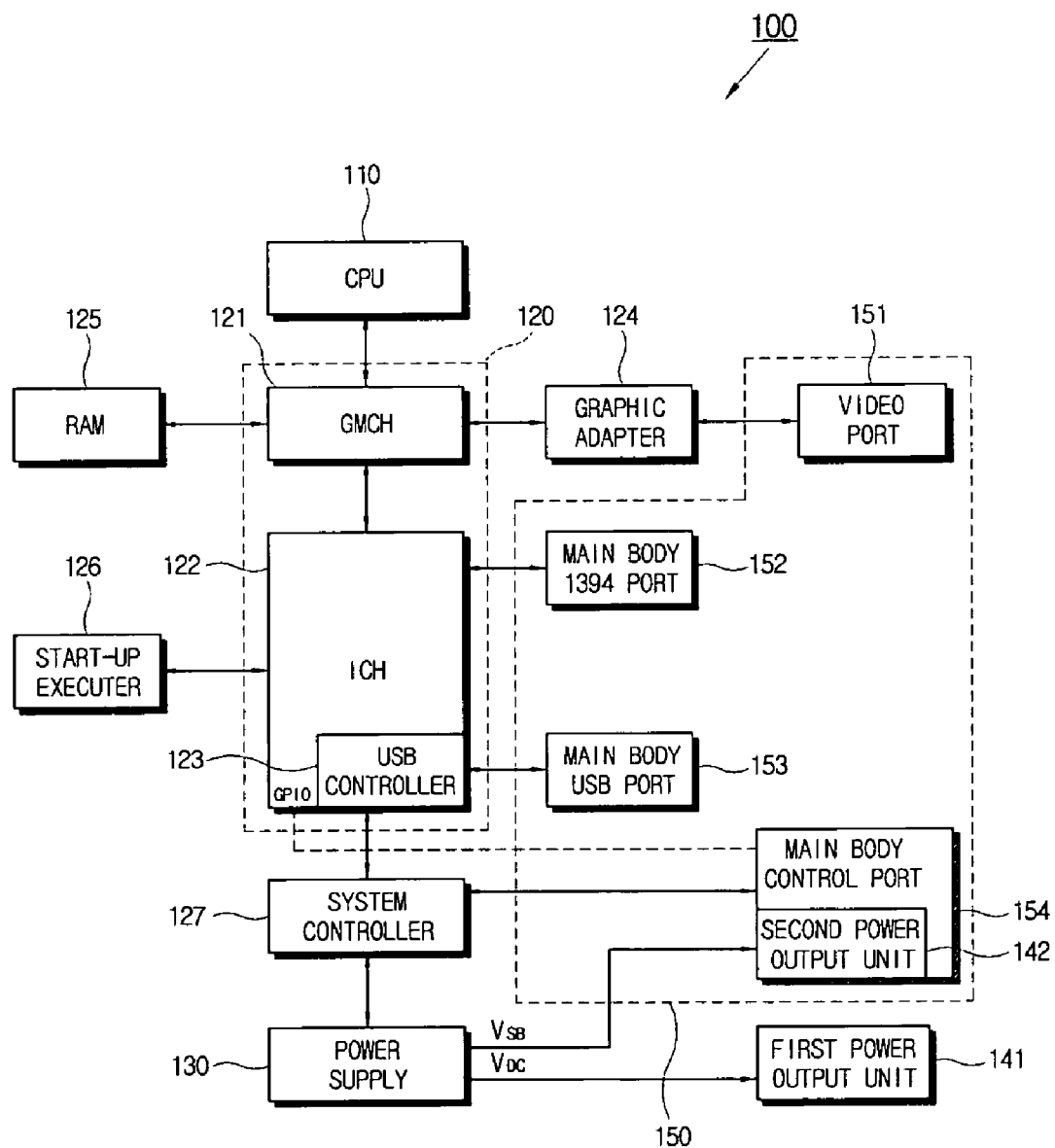
FIG. 7 is a control block diagram of the computer main body of the electronic device system of FIG. 5.

As shown in FIGS. 5, 6 and 7, the electronic device system 10, according to an embodiment of the invention, includes a computer main body 100, a monitor 200, and a device connection cable 400 connecting the computer main body 100 with the monitor 200. The computer main body 100 includes a plurality of first input/output ports 150. For example, the first input/output ports 150 are placed in a predetermined region of the back of the computer main body 100. Alternatively, the first input/output ports 150 can be placed in a predetermined region of the front or the side of the computer main body 100. The first input/output ports 150 provided in the computer main body 100 can include a video port 151 to output a video signal to the monitor 200, at least one main body universal serial bus (USB) port 153 corresponding to a USB interface standard, and a main body 1394 port 152 corresponding to an Institute of Electrical and Electronic Engineers (IEEE) 1394 interface standard. Further, the first input/output ports 150 can include a main body control port 154 to receive and output a predetermined control signal. In this regard, the main body control port 154 is used in exchanging a control signal between a system controller 127 of the computer main body 100 and the monitor 200.

The computer main body 100, according to an embodiment of the invention, includes a central processing unit (CPU) 110; a main chipset 120, such as a graphic memory control hub (GMCH) 121 and the ICH 122, a graphic adapter 124 connected to the GMCH 121 and outputting a video signal through the main body video port 151, a random access memory (RAM) 125, and a system controller 127. Further, the ICH 122 of the computer main body 100 includes a USB controller 123 to manage a signal input and output through the main body USB port 153. The USB controller 123 is integrally provided in the ICH 122 as shown in FIG. 7, or can be provided as a chip separately from the ICH 122. The system controller 127, such as processor, microprocessor or an application specific integrated circuit (ASIC), with the requisite software and/or programming, is connected to the ICH 122, and controls the power management and other input/output signals of the computer main body 100. In this regard, the system controller 127 manages whether a power supply 130 supplies the power to the electronic device system 10.

The computer main body 100 is provided with a first power output unit 141 to output the main power $V_{DC}$ having a predetermined voltage level from the power supply 130. The main power $V_{DC}$ output through the first power output unit 141 is supplied to the monitor 200 via the first power input unit 210 of the monitor 200. Also, the power supply 130 of the computer main body 100 supplies the standby power $V_{SB}$ having a predetermined level, e.g., DC 5V to the monitor 200 through a second power output unit 142.

The second power output unit 142 of the computer main body 100, according to an embodiment of the invention, can be provided integrally with the main body control port 154. For example, the second power output unit 142 can be allocated to at least one pin among the pins of the main body control port 154, so that the standby power $V_{SB}$ is supplied to the monitor 200 through the allocated pin of the main body control port 154. Thus, there is no need of a separate connector or a separate cable to supply the standby power $V_{SB}$, thereby simplifying the connection between the computer main body 100 and the monitor 200.

Referring to FIG. 5, the monitor 200, according to an embodiment of the invention, includes a display unit 260 and a console stand 270 supporting the display unit 260. The display unit 260 includes a display module 263 displaying thereon an image, a front case 262 opened to the front to expose the image displayed on the display module 263 to the outside of the monitor 200, and a rear case 261 coupled to the front case 262 and accommodating therein the display module 263. The display module 263 includes a display panel (not shown), such as a liquid crystal display (LCD) panel or the like, and an image processor (not shown) processing the video signal from the computer main body 100 to be displayed as an image on the display panel. The console stand 270 is coupled to and supports the display unit 260, and the console stand 270 accommodates therein a plurality of electronic components 300.

Also, referring to FIGS. 8 through 11, the monitor 200, according to an embodiment of the invention can include a combination port 274 electrically connected to the first input/output ports 150 of the computer main body 100, and a plurality of second input/output ports to which an external device is connected. Further, the electronic component 300 of the monitor 200 can include the display panel, the image processor, and a control module 310 to control an interface among the combination port 274 and the second input/output ports.

Figure 8:
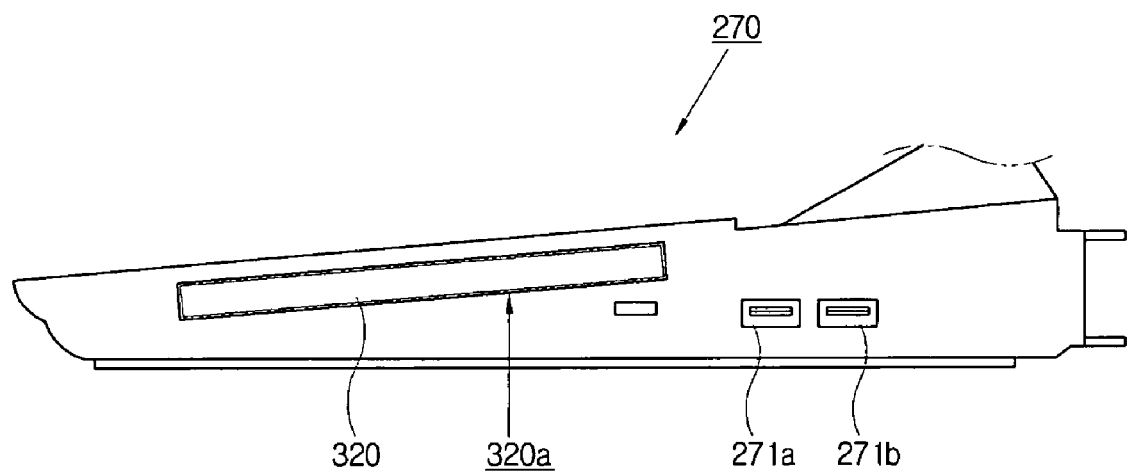
FIGS. 8 through 10 illustrate sides of a console stand of the electronic device system of FIG. 5.
Figure 9:
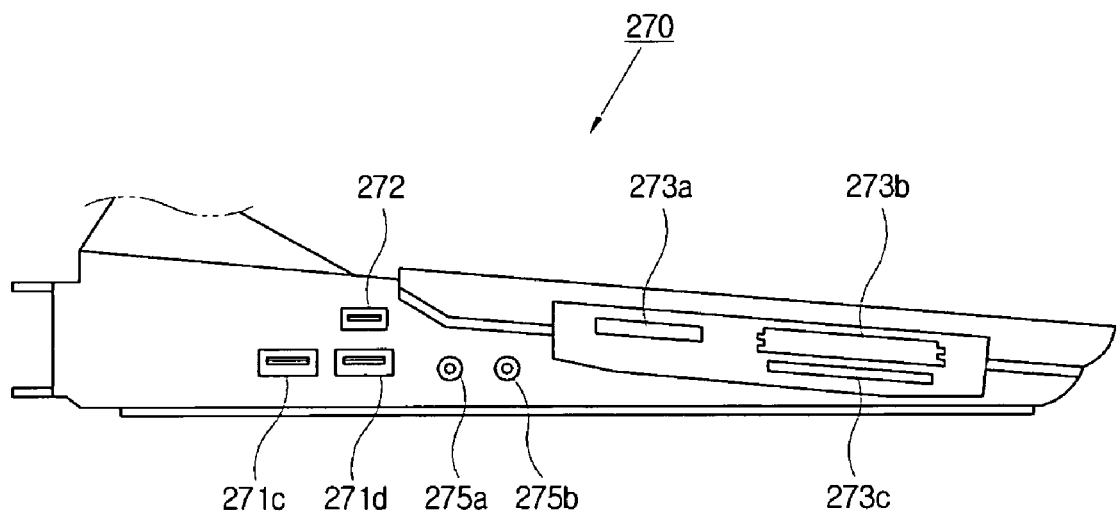
Figure 10:
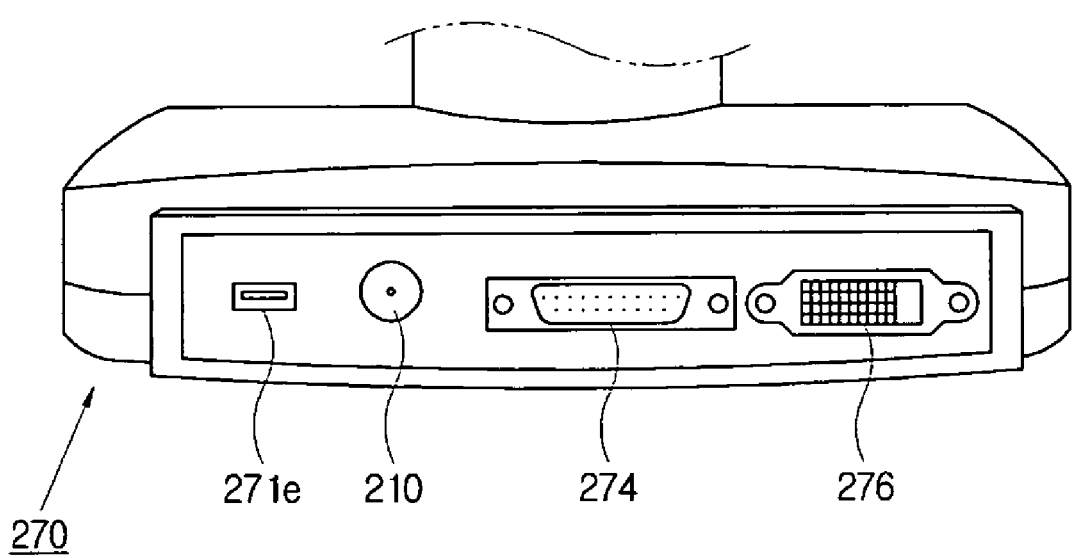

As shown in FIGS. 8 through 10, the second input/output ports are provided in an external region of the consol stand 270. The second input/output ports can include at least one console USB port, such as ports 271a, 271b, 271c, 271d, 271e based on the USB interface standard, a console 1394 port 272 based on the IEEE 1394 interface standard, audio input/output ports 275a, 275b, and memory card slots 273a, 273b, 273c in which a memory card based on a predetermined standard is connected.

As shown, for example, in FIGS. 8 and 9, respective two console USB ports 271a and 271b, and 271c and 271d are placed in the opposite outer sides of the console stand 270. Further, one console USB port 271e can be placed in the outer rear side of the console stand 270 as shown in FIG. 10. In FIG. 5, as an example of the external device, a keyboard 30 is connected to the console USB port 271e placed in the outer rear side of the console stand 270, and a mouse 50 is connected to the console USB port 271a placed in the right outer side of the console stand 270.

Further, as shown in FIG. 9, the console 1394 port 272, according to an embodiment of the invention, is placed in the left side of the console stand 270 by way of example. Also, as shown in FIG. 9, the audio input/output ports 275a, 275b, according to an embodiment of the invention, are placed in the left side of the console stand 270 by way of example. The audio input/output ports 275a, 275b can include an earphone terminal 275a to output an audio signal, and a microphone terminal 275b to receive an audio signal. Additionally, the audio input/output ports 275a, 275b can include a Sony/Philips digital interface (S/PDIF) terminal (not shown) to output a digital audio signal.

As shown in FIG. 9, the memory card slots 273a, 273b, 273c, according to an embodiment of the invention, are placed in the left side of the console stand 270 by way of example. Here, at least two memory card slots 273a, 273b, and/or 273c can be provided according to the type or kind of the memory card. For example, FIG. 9 illustrates a first memory card slot 273a for a memory stick (MC), an MC pro, a secure digital (SD) or a multi media card (MMC), a second memory card slot 273b for a compact flash (CF) or a microdrive (MD), and a third memory card slot 273c for a smart media card (SMC) or an XD picture card, which are placed in the left side of the console stand 270 by way of example.

Further, as shown in FIG. 10, the combination port 274 is placed at the outer rear side of the console stand 270. The combination port 274 is connected with a second connector 420 (FIG. 14) of the device connection cable 400. Thus, a signal, such as a video signal or the like, is transmitted from the computer main body 100 to the display unit 260 and the control module 310 through the device connection cable 400, and a signal output from the external device connected to a corresponding one of the second input/output ports via the control module 310 is transmitted to the computer main body 100 through a main body/console cable (not shown).

Figure 11:
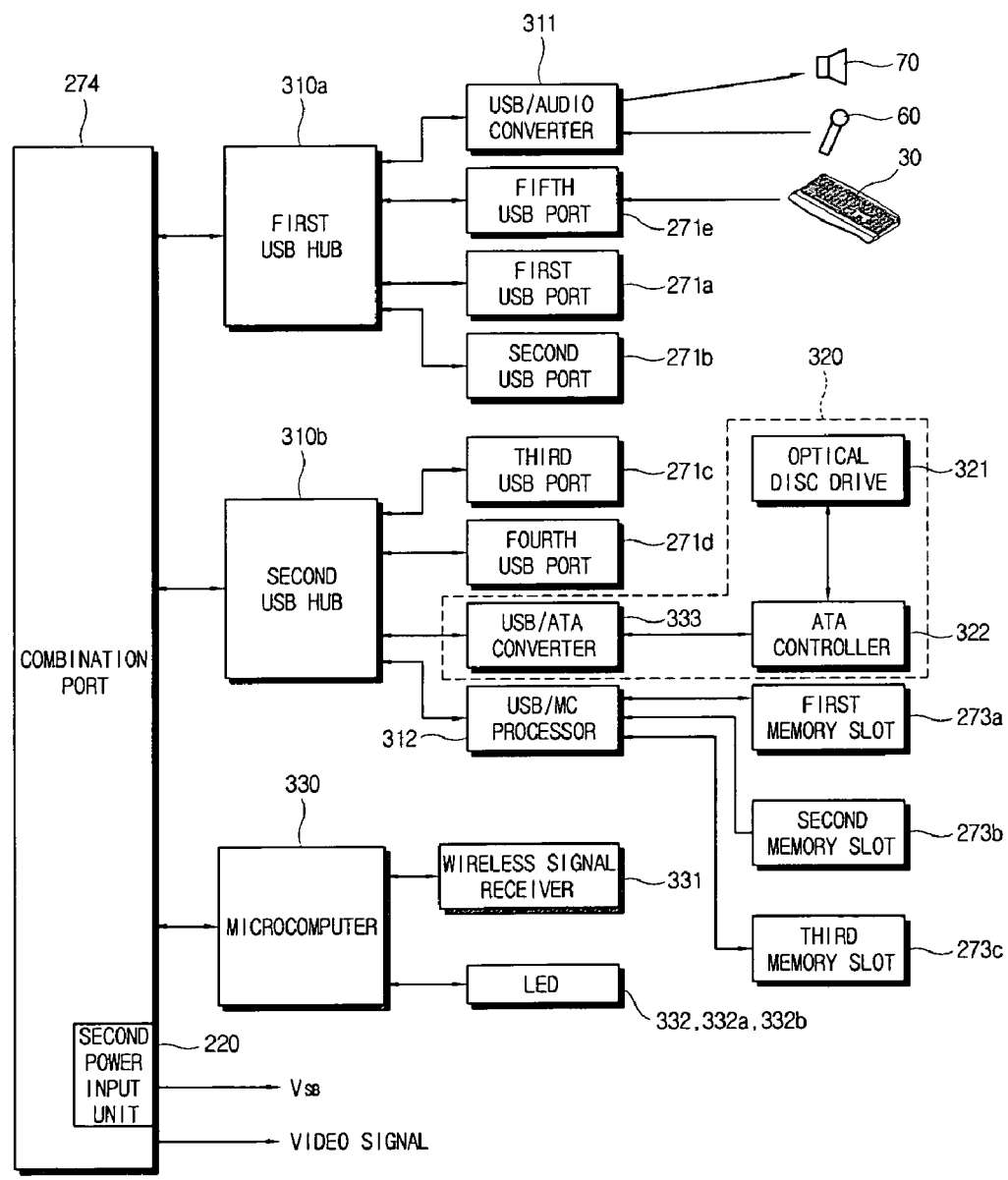
FIG. 11 is a control block diagram of a monitor of the electronic device system of FIG. 5.

The control module 310 controls the interface between the combination port 274 and the first input/output ports 150. As shown in FIG. 11, the control module 310, according to an embodiment of the invention, includes at least one of a first USB hub 310a and a second USB hub 310b. For example, the control module 310, according to an embodiment of the invention, includes two USB hubs 310a and 310b, namely the first USB hub 310a and the second USB hub 310b, respectively. The first USB hub 310a and the second USB hub 310b manage a signal exchange based on the USB interface standard using the console USB ports 271a, 271b, 271c, 271d and 271e and the console 1394 port 272. Further, the first USB hub 310a and the second USB hub 310b are electrically connected to the computer main body 100 through the combination port 274, with a USB/audio converter 311 illustrated as being electrically connected to the first USB hub 310a.

In FIG. 11, two console USB ports (hereinafter, referred to as a 'first console USB port' 271a and a 'second console USB port' 271b) are connected to the first USB hub 310a, and two console USB ports (hereinafter, referred to as a 'third console USB port' 271c and a 'fourth console USB port' 271d) are connected to the second USB hub 310b. Further, a console USB port (hereinafter, referred to as a 'fifth console USB port' 271e) placed in the outer rear side of the console stand 270 is connected to the first USB hub 310a.

The USB/audio converter 311 is connected to the first USB hub 310a, and converts a signal based on the USB interface standard output from the first USB hub 310a into an audio signal. Further, the USB/audio converter 311 outputs the audio signal to the outside through the earphone terminal and/or a speaker. Here, the audio signal output through an earphone terminal and/or a speaker 70 is transmitted as a signal based on the UBS interface standard from the computer main body 100 to the first USB hub 310a through the combination port 274.

Further, the USB/audio converter 311 converts the audio signal input through a microphone 60 connected to the microphone terminal into a signal based on the USB interface standard, thereby outputting it to the first USB hub 310a. Also, the first USB hub 310a transmits the USB interface standard signal to the computer main body 100 through the combination port 274 in correspondence to the audio signal from the USB/audio converter 311. Also, the USB/audio converter 311 exchanges the digital audio signal input/output through the S/PDIF terminal with the computer main body 100 through the first USB hub 310a and the combination port 274, thereby inputting or outputting the digital audio signal.

Further, the control module 310 can include a USB/MC processor 312 to manage a signal exchange between the memory card slots 273a, 273b, 273c and the second USB hub 310b. Also, as shown in FIG. 11, the electronic component 300 of the monitor 200, according to an embodiment of the invention, can further include an optical disc module 320 to exchange a signal with the second USB hub 310b on the basis of the USB interface standard. The optical disc module 320 includes an optical disc drive 321 in which an optical disc is inserted, an advanced technology attachment (ATA) controller 322 to generate a signal based on an ATA interface standard on the basis of data read by the optical disc drive 321, and a USB/ATA converter 333 to convert a signal between the ATA interface standard signal of the ATA controller 322 and the USB interface standard signal. For example, the optical disc drive 321, as shown in FIGS. 5 through 8, includes a tray 320a that is accommodated in the console stand 270 and exposed to the right side of the console stand 270.

Figure 12:
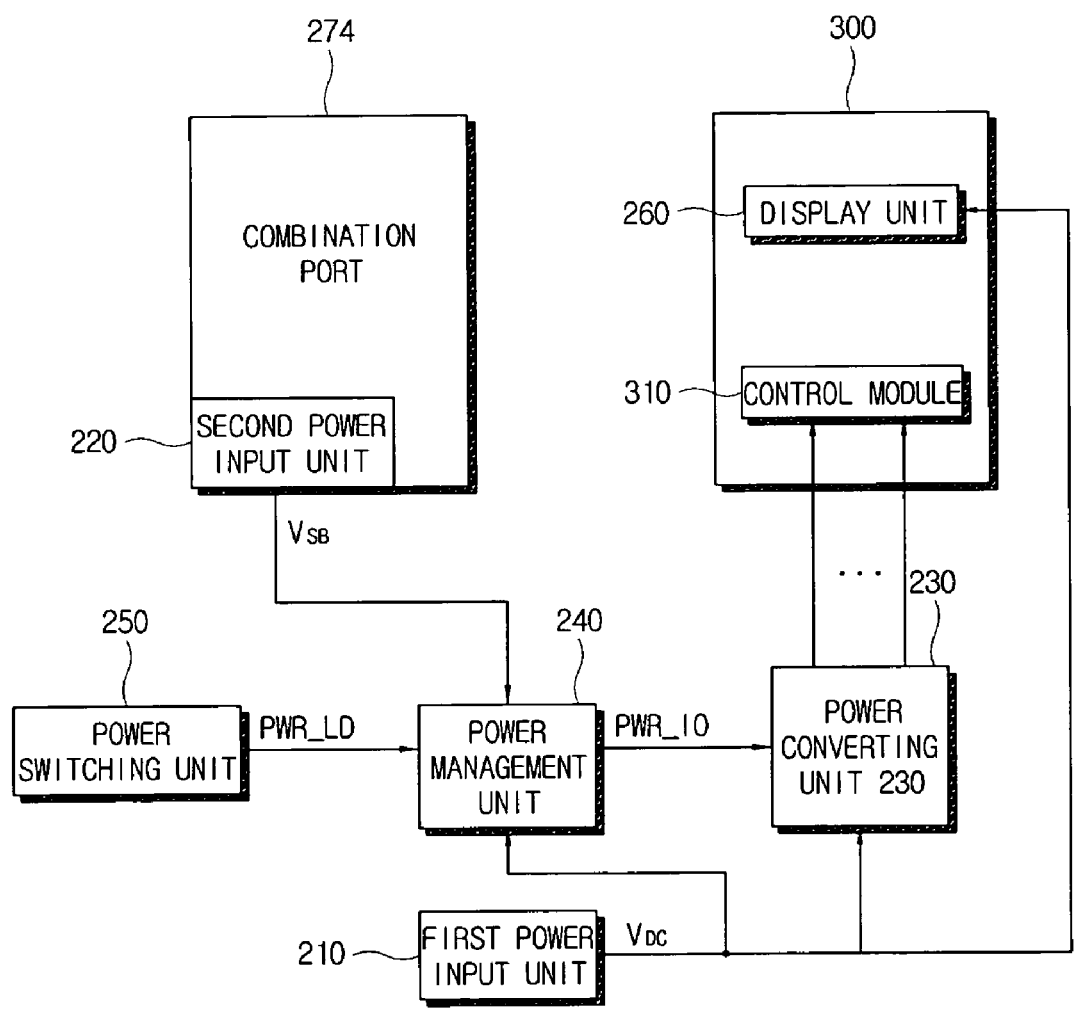
FIG. 12 is a control block diagram of a power management system of the electronic device system of FIG. 5.

A power supplying system of the monitor 200, according to an embodiment of the invention, is further described with reference to FIG. 12. As shown therein, the monitor 200 includes the first power input unit 210, the second power input unit 220, the power converting unit 230, the power switching unit 250 and the power management unit 240. The first power input unit 210, the second power input unit 220, the power converting unit 230, the power switching unit 250 and the power management unit 240 of the monitor 200 are operated as described with respect to the second electronic device 200.

The first power input unit 210 can have a DC connection structure of a commercial power adapter. Thus, the first power input unit 210 is connected to the first power output unit 141 of the computer main body 100 through a first power cable 430 (FIG. 14) and receive the main power $V_{DC}$ from the computer main body 100. Further, the first power input unit 210 can be connected to a DC jack of the commercial power adapter and receive the main power $V_{DC}$ from the commercial power adapter.

The second power input unit 220 can be provided integrally with the combination port 274. As described above, when the second power output unit 142 of the computer main body 100 is provided integrally with the main body control port 154, the second power input unit 220 can allocate a pin corresponding to a pin for the second power output unit 142 allocated to the main body control port 154 among the pins of the combination port 274 as a pin to receive the standby power $V_{SB}$ from the computer main body 100. Also, the power switching unit 250 can have the switch 251 as shown in FIG. 5, which is placed in an outer front region of the console stand 270.

Referring also to FIG. 11, the control module 310, according to an embodiment of the invention, can include a microcomputer 330 accommodated in the console stand 270, and at least one light emitting diode (LED) 332 placed in the outer side of the console stand 270 and selectively turned on and off according to the control of the microcomputer 330. In this regard, the microcomputer 330 can turn on and off the LED 332 according to operating states of at least one among the computer main body 100, the display unit 260 and the console stand 270.

For example, the LCD 332 can include a hard disk drive (HDD) LED 332a turned on and off according to whether an HDD of the computer main body 100 operates or not, and a power LED 332b turned on and off according to whether the computer main body 100 and the monitor 200 are turned on or off. In this regard, information about whether the HDD operates or not and about whether the system power is turned on or off can be transmitted from the computer main body 100 to the microcomputer 330 through the combination port 274.

Further, the control module 310 can include a wireless signal receiver 331 to receive a wireless signal from a remote controller (not shown). Here, the microcomputer 330 senses a wireless signal, such as an infrared ray (IR) signal or the like, received through the wireless signal receiver 331, and transmits a corresponding control signal to the computer main body 100 through a control signal pin of the combination port 274. Further, the computer main body 100 performs a previously set operation on the basis of the control signal transmitted from the microcomputer 330 of the console stand 270.

Referring also to FIG. 7, the computer main body 100, according to an embodiment of the invention, can include a start-up executer 126 to start up the computer main body 100 on the basis of one start-up routine among various start-up routines corresponding to a plurality of operating modes. For example, the start-up executer 126 can be achieved by a basic input output system (BIOS) stored in a BIOS read only memory (RAM) 125 provided in the computer main body 100. Regardless of the routine's name, the start-up routine can include any suitable start-up routine to control an initial operation of the computer main body 100.

The operating mode of the computer main body 100 can include a main operating mode performing a main operating system of the computer main body 100; and an auxiliary operating mode performing some function of the computer main body 100, e.g., reproducing a multimedia file. For example, when the start-up executer 126 receives a control signal corresponding to performing an auxiliary operating mode from the microcomputer 330 of the console stand 270, the power is supplied to only the electronic components 300 related to performing the auxiliary operating mode while the computer main body 100 is initially operated.

Referring to FIGS. 1, 2, 4, 7 and 11, when the computer main body 100 and the monitor 200, according to an embodiment of the invention, are connected to each other, the standby power $V_{SB}$ is supplied from the computer main body 100 to the monitor 200, and the power converting unit 230 of the monitor 230 is maintained in an enabling state, whereby the power switching unit 250 can be selectively manipulated independent of enabling the power converting unit 230, as previously described. In the state that the computer main body 100 and the monitor 200 are connected to each other, when a user selectively manipulates the switch 251 to turn on the computer main body 100 and the monitor 200, a signal is transmitted to the ICH 122 of the computer main body 100 through the terminal PWRBTN*. Therefore, the computer main body 100 is turned on.

In this case, the microcomputer 330 of the monitor 200 senses that the terminal PWRBTN* is not changed in the state corresponding to the state change of the terminal MIO_P-WBTN of the power switching unit 250 on the basis of the unchanged state of the terminal MIO_PWBTN, thereby informing the computer main body 100 of the unchanged state of the terminal PWRBTN* through the combination port 274. Therefore, the computer main body 100 performs the main operation mode.

On the other hand, in the case that the state change of the terminal PWRBTN* is due to the state change of the terminal MIO_PWBTN, the microcomputer 330 senses the state change of the terminal MIO_PWBTN, and informs the computer main body 100 of this state change through the combination port 274. Therefore, the computer main body 100 performs the auxiliary operation mode.

Also, when the monitor 200, according to an embodiment of the invention, is connected to other devices, except the computer main body 100, and does not receive the standby power $V_{SB}$ from the corresponding device, the power management of the monitor 200 is implemented by selectively manipulating the power switching unit 250, as previously described.

Referring to FIG. 13, the pin structure of the combination port 274 of the monitor 200 according to an embodiment of the present invention is described. In the illustrated embodiment, the combination port 274 has a 36-pin structure. The pins of the combination port 274 include video signal receiving pins P7 through P18, USB signal pins P19 through P24, 1394 signal pins P1 through P6, control signal pins P25 through P34, and standby power input pins P35 and P36.

The video signal receiving pins P7 through P18 receive a video signal output from the main body video port 151 of the computer main body 100. The video signal receiving pins P7 through P18 include pins used for receiving the video signal in a pin structure of a D-Sub connector standard, e.g., twelve pins, as shown in FIG. 13. The video signal received through twelve video signal receiving pins P7 through P18 has an analog red, green and blue (RGB) format based on the D-Sub connector standard. Also, the video signal received through twelve video signal receiving pins P7 through P18 is transmitted to the display unit 260 through a signal cable (not shown).

The USB signal pins P19 through P24 include first USB signal pins P19 through P21 and second USB signal pins P22 through P24. The first USB signal pins P19 through P21 are connected to the first USB hub 310a of the control module 310, and the second USB signal pins P22 through P24 are connected to the second USB hub 310b of the control module 310. Further, the first USB signal pins P19 through P21 are connected to one of the USB connectors 413a and 413b of a first connector (FIG. 14) of the device connection cable 400, and the second USB signal pins P22 through P24 are connected to the other one of the USB connectors 413a and 413b of a main body connector of the device connection cable 400. Thus, the USB connectors 413a and 413b of the main body connector of the device connection cable 400 are connected to the main body USB port 153 of the computer main body 100, respectively, so that the first USB signal pins P19 through P21 and the second USB signal pins P22 through P24 are electrically connected to the computer main body 100.

Also, the first USB signal pins P19 through P21 and the second USB signal pins P22 through P24 are allocated to a signal line and a ground line based on the USB interface standard. That is, the first USB signal pins P19 through P21 and the second USB signal pins P22 through P24 include a respective two signal pins P19 and P20 and P22 and P23 and one respective ground pin P21 and P24, so as to each include three pins. In this regard, the external device connected to the console USB ports 271a, 271b, 271c, 271d and 271e of the console stand 270 can receive power based on the USB interface standard, i.e., receive power from the power converting unit 230 of the console stand 270 or receive power through the first or second USB hubs 310a and 310b.

The 1394 signal pins P1 through P6 are connected to the 1394 connector 412 of the main body connector of the device connection cable 400 (FIG. 14), and electrically connected to the computer main body 100 when the 1394 connector 412 is connected to the main body 1394 port 152 of the computer main body 100. Four signal pins P2 through P5 and two ground pins P1 and P6 are allocated to the 1394 signal pins P1 through P6.

According to an embodiment of the invention, as illustrated in FIG. 13, ten signal pins are allocated to the control signal pins P25 through P34. The control signal pins P25 through P34 include two main body information pins P25 and P27 to transmit information about the operating state of the computer main body 100, i.e., information about the driving state of the HDD or information about whether the computer system is turned on or off, to the monitor 200. The main body information pins P25 and P27 are connected to the microcomputer 330 of the console stand 270 and, therefore, the microcomputer 330 controls the LED 332 to be selectively turned on and off on the basis of the information about the operating state of the computer main body 100 received through the main body information pins P25 and P27.

Further, the control signal pins P25 through P34 can include a PWR pin P14 to transmit a control signal corresponding to the selection of the power switching unit 250 from the microcomputer 330 to the computer main body 100, and a general purpose input/output (GPIO) pin connected to a GPIO pin of the microcomputer 330. Also, the control signal pins P25 through P34 includes three IR pins P28, P29 and P31 allowing the microcomputer 330 to transmit a control signal corresponding to the wireless signal received from the wireless signal receiver 331 to the computer main body 100. Two pins P28 and P29 among the IR pins P28, P29 and P31 are allocated to transmitting the data, and the remaining one is allocated to processing a signal of the remote controller prior to the signal of the keyboard 30 or the mouse 50 input to the computer main body 100, when the wireless signal receiver 331 receives the signal from the remote controller.

Further, the control signal pins P25 through P34 include two power saving mode pins P32 and P33 to receive information about whether or not the computer main body 100 enters a power saving mode. One of the power saving mode pins P32 and P33 is allocated to allowing the computer main body 100 to inform the microcomputer 330 of the console stand 270 that the electronic device system 10 enters an S3 mode (i.e., a standby mode) of an advanced configuration and power interface (ACPI), and the other one of the power saving mode pins P32 and P33 is allocated to allowing the computer main body 100 to inform the microcomputer 330 of the console stand 270 that the system enters an S4 mode (i.e., the power saving mode) of the ACPI. At this time, the microcomputer 330 can interrupt the power supplied to the monitor 200, the control module 310 or the optical disc module 320. Also, one of the control signal pins P25 through P34 is allocated to a ground pin P34.

The standby power input pins P35 and P36 are allocated to two pins of the combination port 274. One of the standby power input pins P35 and P36 is used as a standby power supplying pin P36, and the other one of the standby power input pins P35 and P36 is used as a ground pin P35. Further, alternatively, each pin numeral of the combination port 274 shown in FIG. 13 can vary, depending upon the use or application.

Figure 14:
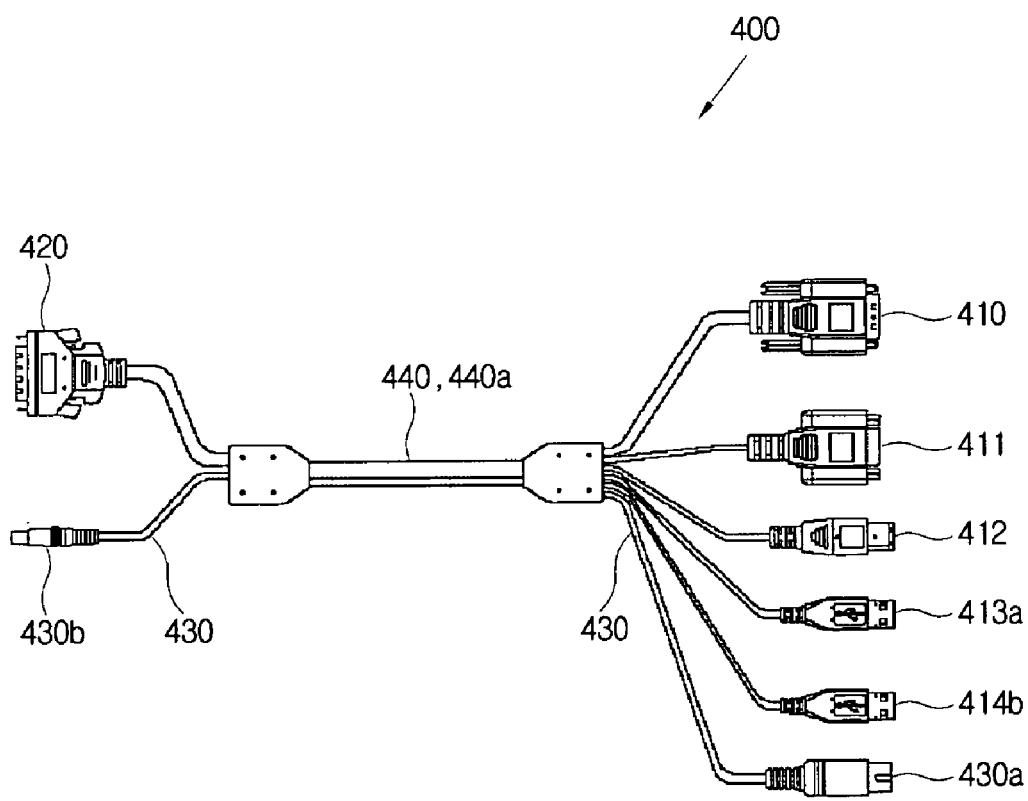
FIG. 14 illustrates a device connection cable of the electronic device system of FIG. 5.

Referring to FIG. 14, the device connection cable 400, according to an embodiment of the invention, includes a plurality of first connectors 410, 411, 412, 413a and 413b connected to the plurality of first input/output ports 150 provided in the computer main body 100, respectively; the second connector 420 connected to the combination port 274 of the monitor 200; and a combination cable 440 electrically connecting the plurality of first connectors with the second connector 420.

The second connector 420 has a connection structure to be connected to the combination port 274, and has a pin structure that corresponds to the pin structure of the combination port 274, as previously described.

In this regard, the plurality of first connectors include a video connector 410, two USB connectors 413a and 413b, a 1394 connector 412, and a control connector 411, that are respectively connected to the video port 151, two main body USB ports 153, the main body 1394 port 152, and the main body control port 154 which are provided in the computer main body 100.

The video connector 410 has a connection structure based on the D-Sub connector standard. The USB connectors 413a and 413b each has a connection structure based on the USB interface standard. The 1394 connector 412 has a connection structure based on the 1394 interface standard. Thus, the computer main body 100, according to an embodiment of the invention, can use a commercial input/output port for connection with the monitor 200 without using a separate port. Further, the monitor 200 can be connected to a commercial computer main body, as the computer main body 100, according to an embodiment of the invention, through the device connection cable 400, thereby promoting an improvement in compatibility.

The control connector 411 has a connection structure to connect to the main body control port 154 provided in the computer main body 100. According to an embodiment of the invention, the control connector 411 and the main body control port 154 have a connection structure based on the D-Sub connector. For example, the control connector 411 and the main body control port 154 can be achieved by a D-Sub female connector and a D-Sub male connector, each having fifteen pins.

In an embodiment of the invention, the main body control port 154 has a connection structure of the D-Sub male connector, and the control connector 411 has a connection structure of the D-Sub female connector. Thus, when the main body video port 151 has a connection structure of a D-Sub female connector, and the main body control port 154 is provided to have the connection structure of the D-Sub male connector, a user can be prevented from wrongly connecting the video connector 410 and the control connector 411 of the main body connector with the main body video port 151 and the main body control port 154 of the computer main body 100.

Further, the video connector 410, two USB connectors 413a and 413b, the 1394 connector 412, and the control connector 411 are connected to the second connector 420 through the combination cable 440. In this regard, the respective pins of the video connector 410, two USB connectors 413a and 413b, the 1394 connector 412, and the control connector 411 and the pins of the second connector 420 are connected as shown in FIG. 13. In FIG. 13, the second connector 420 has pin numerals corresponding to the pin numerals of the foregoing combination port 274, and the first input/output ports 150 have pin numerals corresponding to the pin numerals based on the D-Sub connector standard, the USB interface standard and the IEEE 1394 interface standard, respectively.

Also, the combination cable 440 is provided to connect the respective pins of the video connector 410, two USB connectors 413a and 413b, the 1394 connector 412, and the control connector 411 with the pins of the console connector, the second connector 420, to be connected to the combination port 274. Further, the power switching signal from the power switching unit 250 can be transmitted through the combination port 274 and through the device connection cable 400 to at least a corresponding one of the input/output ports, such as corresponding to the input-output control hub (ICH) 122 of the computer main body 100 (FIG. 7) and, therefore, the computer main body 100 can sense an operating state of the power switching unit 250. Therefore, the system controller 127 can selectively control whether the power supply 130 outputs the first power, or the main power $V_{DC}$, or the second, or the standby power $V_{SB}$ corresponding to the input power switching signal.

Continuing with reference to FIGS. 5 and 14, the electronic device system 10, according to an embodiment of the invention, includes the first power cable 430 connecting the computer main body 100 with the monitor 200 and through which the main power $V_{DC}$ from the computer 100 is supplied to the monitor 200, and a second power cable 440a through which the standby power $V_{SB}$ output from the computer main body 100 is supplied to the monitor 200. As shown in FIG. 14, the first power cable 430 has a first side provided with a first power connector 430a to be connected to the first power output unit 141 of the computer main body 100, and a second side provided with a second power connector 430b to be connected to the first power input unit 210 of the monitor 200. Further, the second power cable 440a can be provided integrally with the combination cable 440, as previously described.

As described above, the invention provides an electronic device and an electronic device system, in which a second electronic device receives power from a first electronic device and/or other external power device, and the power supplied to the second electronic device is controlled by the first electronic device or by the second electronic device, independent of the first electronic device, depending upon the input of a first power, such as a main power, and a second power, such as a standby power, to the second electronic device.

The foregoing embodiments, aspects and advantages are merely exemplary and are not to be construed as limiting the invention. Also, the description of the embodiments of the invention is intended to be illustrative, and not to limit the scope of the claims, and various other alternatives, modifications, and variations will be apparent to those skilled in the art. Therefore, although a few embodiments of the invention have been shown and described, it would be appreciated by those skilled in the art that changes may be made in the embodiments without departing from the principles and spirit of the invention, the scope of which is defined in the claims and their equivalents.

What is claimed is:

1. An electronic device including a plurality of electronic components, the electronic device comprising:
    a power switching unit for outputting a power switching signal based on selective manipulation;
    a first power input unit for receiving a first power from one of a plurality of external power devices;
    a second power input unit for receiving a second power from one of the plurality of external power devices;
    a power converting unit for converting the first power received through the first power input unit into a driving power comprising a voltage level to drive the plurality of electronic components, and for supplying the driving power to the plurality of electronic components; and
    a power management unit for selectively controlling the power converting unit, wherein the power management unit enables the power converting unit when the second power is input through the second power input unit, and wherein the power management unit controls whether the power converting unit is enabled corresponding to the power switching signal from the power switching unit based on the selective manipulation, when the second power is not input through the second power input unit.

2. The electronic device according to claim 1, wherein the power converting unit operates according to whether the first power is supplied from the first power input unit, when the power converting unit is enabled by the power management unit when the second power is input through the second power input unit.

3. The electronic device according to claim 2, wherein the power converting unit comprises a DC/DC converter for converting the voltage level of the first power into a plurality of driving powers comprising corresponding voltage levels to drive the respective electronic components.

4. The electronic device according to claim 2, wherein the power management unit comprises a JK flip-flop including:
    a preset input terminal for determining a logic value according to whether the second power is input;
    a J input terminal and a K input terminal for determining logic values according to whether the first power is input;
    a clock input terminal for inputting the power switching signal from the power switching unit; and
    a Q output terminal for controlling whether the power converting unit is enabled according to the logic values of the preset, J, K and clock input terminals.

5. The electronic device according to claim 4, wherein:
    the preset input terminal of the JK flip-flop is set for outputting an enable signal comprising the logic value to enable the power converting unit through the Q output terminal when the second power is supplied, and the preset input terminal of the JK flip-flop is set for varying the logic value of the enable signal output through the Q output terminal corresponding to a logic value of the power switching signal input through the clock input terminal, when the second power is not supplied.

6. The electronic device according to claim 5, wherein:
the one of the plurality of external power devices providing the first power comprises a commercial power adapter, and
the first power input unit includes a DC connection structure for receiving the commercial power adapter.

7. The electronic device according to claim 1, wherein the first power and the second power are input from one of the plurality of external power devices.

8. An electronic device system comprising:
a first electronic device, including:
a first power output unit for outputting a first power outside of the first electronic device, and
a second power output unit for outputting a second power outside of the first electronic device; and
a second electronic device, including:
a plurality of electronic components for connecting with the first electronic device,
a power switching unit for outputting a power switching signal based on selective manipulation,
a first power input unit for receiving one of the first power from the first electronic device and external power from a predetermined external power device,
a second power input unit for receiving the second power from the first electronic device,
a power converting unit for receiving the first power received through the first power input unit into a driving power comprising a voltage level to drive the plurality of electronic components, and for supplying the driving power to the plurality of electronic components, and
a power management unit for controlling the power converting unit, wherein the power management unit enables the power converting unit when the second power is input through the second power input unit, and wherein the power management unit controls whether the power converting unit is enabled corresponding to the power switching signal from the power switching unit based on the selective manipulation, when the second power is not input through the second power input unit.

9. The electronic device system according to claim 8, wherein the power converting unit operates according to whether power is supplied through the first power input unit, when the power converting unit is enabled when the second power is input through the second power input unit.

10. The electronic device system according to claim 9, wherein the power converting unit comprises a DC/DC converter for converting the voltage level of the first power into a plurality of driving powers comprising corresponding voltage levels for driving respective electronic components.

11. The electronic device system according to claim 9, wherein the power management unit comprises a JK flip-flop including:
a preset input terminal for determining a logic value according to whether the second power is input;
a J input terminal and a K input terminal for determining logic values according to whether the first power is input;
a clock input terminal for inputting power switching signal from the power switching unit; and
a Q output terminal for controlling the power converting unit to be enabled according to the logic values of the preset, J, K and clock input terminals.

12. The electronic device system according to claim 11, wherein:
the preset input terminal of the JK flip-flop is set for outputting an enable signal comprising the logic value for enabling the power converting unit through the Q output terminal, when the second power is supplied, and
the preset input terminal of the JK flip-flop is set for varying the logic value of the enable signal output through the Q output terminal in correspondence to a logic value of the power switching signal input through the clock input terminal, when the second power is not supplied.

13. The electronic device system according to claim 12, wherein:
the external power device providing the first power comprises a commercial power adapter, and
the first power input unit includes a DC connection structure to receive the commercial power adapter.

14. The electronic device system according to claim 13, further comprising:
a first power cable for connecting the first power output unit of the first electronic device with the first power input unit of the second electronic device; and
a second power cable for connecting the second power output unit of the first electronic device with the second power input unit of the second electronic device.

15. The electronic device system according to claim 14, wherein:
the first electronic device further comprises:
a plurality of first input/output ports, with the plurality of input/output ports including a video port for outputting a video signal; and
the second electronic device further comprises:
a combination port for electrically connecting to the plurality of first input/output ports, and
a plurality of second input/output ports to which a corresponding external device is connected; and
the electronic components of the second electronic device comprise:
a display unit for displaying an image based on the video signal received through the combination port, and
a control module for controlling an interface between the combination port and the second input/output ports.

16. The electronic device system according to claim 15, further comprising:
a device connection cable including:
a plurality of first connectors for connecting to the plurality of first input/output ports,
a second connector for connecting to the combination port, and
a combination cable for electrically connecting the plurality of first connectors with the second connector,
wherein the second power cable is provided integrally with the device connection cable and allocated to at least one signal line among signal lines of the device connection cable.

17. The electronic device system according to claim 16, wherein:
the power switching signal output from the power switching unit is transmitted to the first electronic device through the combination port, the device connection cable and at least a corresponding one of the first input/output ports; and
the first electronic device comprises:

a power supply for outputting the first power and the second power, and a system controller for selectively controlling the power supply to output the first power and the second power corresponding to the input power switching signal.

18. The electronic device according to claim 8, wherein the first power and the second power are input from an external power device.

19. The electronic device system according to claim 8, further comprising:

a first power cable for connecting the first power output unit of the first electronic device with the first power input unit of the second electronic device; and a second power cable for connecting the second power output unit of the first electronic device with the second power input unit of the second electronic device.

20. The electronic device system according to claim 19, wherein:

the first electronic device further comprises:

a plurality of first input/output ports, with the plurality of input/output ports including a video port for outputting a video signal; and the second electronic device further comprises:

a combination port for electrically connecting to the plurality of first input/output ports, and a plurality of second input/output ports for connecting to a corresponding external device; and the electronic components of the second electronic device comprise:

a display unit for displaying an image based on the video signal received through the combination port, and a control module for controlling an interface between the combination port and the second input/output ports.

21. The electronic device system according to claim 20, further comprising:

a device connection cable including:

a plurality of first connectors for connecting to the plurality of first input/output ports, a second connector for connecting to the combination port, and a combination cable for electrically connecting the plurality of first connectors with the second connector, wherein the second power cable is provided integrally with the device connection cable and allocated to at least one signal line among signal lines of the device connection cable.

22. The electronic device system according to claim 21, wherein:

the power switching signal output from the power switching unit is transmitted to the first electronic device through the combination port, the device connection cable and at least a corresponding one of the first input/output ports; and the first electronic device comprises:

a power supply for outputting the first power and the second power, and a system controller for selectively controlling the power supply for outputting the first power and the second power corresponding to the input power switching signal.

23. The electronic device system according to claim 22, wherein the power supplied to the second electronic device is controlled by at least one of the first electronic device and the second electronic device, independent of the first electronic device, depending upon the input of the first power and the second power to the second electronic device.

24. The electronic device system according to claim 23, wherein the first power comprises a main power for the second electronic device and the second power comprises a standby power for the second electronic device.

25. A method for controlling power in an electronic device including a plurality of electronic components, the method comprising:

selectively receiving a first power from one of a plurality of external power devices;

selectively receiving a second power from one of the plurality of external power devices;

converting, by a power converting unit, the first power into a driving power comprising a voltage level to drive the plurality of electronic components; and controlling the power converting unit to selectively enable the power converting unit when the second power is received, and controlling the power converting unit to selectively enable the power converting unit corresponding to a power switching signal based on selective manipulation, when the second power is not received.

26. The method of claim 25, wherein the converting, by a power converting unit, of the first power further comprises converting a voltage level of the first power into a plurality of driving powers having corresponding voltage levels to drive the respective electronic components.

27. The method of claim 26, wherein the controlling of the power converting unit to selectively enable the power converting unit further comprises selectively controlling the power supplied to the electronic device by at least one of an external power device that provides power to the electronic device and the electronic device, independent of the external power device, depending upon the input of the first power and the second power to the electronic device.

28. The method of claim 27, wherein the first power comprises a main power for the electronic device and the second power comprises a standby power for the electronic device.

29. The method of claim 25, wherein the controlling of the power converting unit to selectively enable the power converting unit further comprises selectively controlling the power supplied to the electronic device by at least one of an external power device that provides power to the electronic device and the electronic device, independent of the external power device, depending upon the input of the first power and the second power to the electronic device.

30. The method of claim 29, wherein the first power comprises a main power for the electronic device and the second power comprises a standby power for the electronic device.

31. The method of claim 25, wherein the first power comprises a main power for the electronic device and the second power comprises a standby power for the electronic device.

* * * * *